(12) United States Patent
Tiwari et al.

(10) Patent No.: US 11,216,530 B2
(45) Date of Patent: Jan. 4, 2022

(54) SMART SCHEDULING OF DOCUMENTS

(71) Applicant: SAP SE, Walldorf (DE)

(72) Inventors: Rahul Tiwari, Allahbad (IN);
Devashish Biswas, Haridwar (IN);
Upendra Dandwate, Pune (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/737,105

(22) Filed: Jan. 8, 2020

(65) Prior Publication Data

US 2021/0209188 A1    Jul. 8, 2021

(51) Int. Cl.
*G06F 16/958* (2019.01)
*H04L 29/08* (2006.01)

(52) U.S. Cl.
CPC ............ *G06F 16/986* (2019.01); *H04L 67/28* (2013.01); *H04L 67/325* (2013.01)

(58) Field of Classification Search
CPC ....... G06F 16/986; G06F 16/93; H04L 67/28; H04L 67/325
USPC .................................................... 709/201, 20
See application file for complete search history.

(56) References Cited

U.S. PATENT DOCUMENTS

| | | | |
|---|---|---|---|
| 9,817,653 B2 | 11/2017 | Sreedharan et al. | |
| 10,025,817 B2 | 7/2018 | Mavinakuli et al. | |
| 2004/0103085 A1* | 5/2004 | Ly .......................... | G06F 16/958 |
| 2016/0055196 A1* | 2/2016 | Collins ................. | G06F 40/197 |
| | | | 707/690 |
| 2016/0267090 A1* | 9/2016 | Mavinakuli ........... | G06F 16/242 |
| 2017/0024695 A1* | 1/2017 | Wolfe, Jr. ............... | G06F 16/93 |
| 2017/0052955 A1 | 2/2017 | Nancy et al. | |
| 2018/0150210 A1 | 5/2018 | Pavanje et al. | |
| 2019/0179928 A1 | 6/2019 | Tiwari | |

* cited by examiner

*Primary Examiner* — Tan Doan
(74) *Attorney, Agent, or Firm* — Fish & Richardson P.C.

(57) ABSTRACT

Methods, systems, and computer-readable storage media for receiving, by an adaptive job server, a first document, determining, by the adaptive job server, a validation status of the first document based on one or more document-level pre-requisites associated with the first document, transmitting, by the adaptive job server, the first document to a first proxy server in response to determining that the validation status of the first document is true, determining, by the first proxy server, a validation status of the first proxy server based on one or more server-side pre-requisites for scheduling the first document, and scheduling, by the first proxy server, the first document for publishing to one or more users in response to determining that the validation status of the first proxy server is true.

20 Claims, 6 Drawing Sheets

SMART SCHEDULING OF DOCUMENTS

BACKGROUND

Enterprises implement software systems to conduct operations. Operations of an enterprise generate massive amounts of data including, for example, financial data, sales data, product data, manufacturing data, human resources data, and the like. In an effort to efficiently operate, enterprises seek to understand the data representing operations of the enterprise. To this end, software systems have been developed that process data to generate analytical data, which can include, without limitation, summaries, insights, and visualizations.

In some instances, analytical data is periodically published to users within the enterprise in electronic documents. In some examples, an electronic document (also referred to as a document herein) is a computer-generated document that is stored in a computer-readable file. Example documents can include, without limitation, portable document format (PDF) documents, extensible markup language (XML) documents, hypertext markup language (HTML) documents, email documents (e.g., .msg) and word processor documents (e.g., .doc, .txt). Such documents can include analytical data that periodically changes. For example, analytical data for a first time period (e.g., day, week, month, year) can be different than analytical data for a second time period (e.g., day, week, month, year). Consequently, a document can be periodically published based on a schedule and, with each publication, analytical data in the document can be updated.

Scheduling of documents, however, has certain requirements for problem-free publication. In some examples, a document format can implicate server-side requirements for a server that generates the document. For example, PDF documents can require a Chromium plugin and/or Java scheduling service on servers. In some examples, document-level pre-requisites are also enforced for scheduling. For example, document-level requirements can include a particular component and/or script being installed. Failure in execution of schedules for publishing documents is highly problematic. For example, because of the multiple server-side and/or document-level requirements for different document formats, it can be extremely difficult to determine a correct the cause of the failure.

SUMMARY

Implementations of the present disclosure are directed to a smart scheduling service for scheduling documents for publication to users. More particularly, implementations of the present disclosure provide a multi-stage scheduling service that operates on-demand, provides optimized schedule validation, and includes dynamic fail-over.

In some implementations, actions include receiving, by an adaptive job server, a first document, determining, by the adaptive job server, a validation status of the first document based on one or more document-level pre-requisites associated with the first document, transmitting, by the adaptive job server, the first document to a first proxy server in response to determining that the validation status of the first document is true, determining, by the first proxy server, a validation status of the first proxy server based on one or more server-side pre-requisites for scheduling the first document, and scheduling, by the first proxy server, the first document for publishing to one or more users in response to determining that the validation status of the first proxy server is true. Other implementations of this aspect include corresponding systems, apparatus, and computer programs, configured to perform the actions of the methods, encoded on computer storage devices.

These and other implementations can each optionally include one or more of the following features: actions further include receiving, by the adaptive job server, a second document, and determining, by the adaptive job server, a validation status of the second document based on one or more document-level pre-requisites associated with the second document; actions further include, in response to determining that the validation status of the second document is false: blocking the second document from scheduling and performing one or more of issuing a notification and receiving a third document; actions further include transmitting, by the adaptive job server, the second document to a second proxy server in response to determining that the validation status of the second document is true, determining, by the second proxy server, a validation status of the second proxy server based on one or more server-side pre-requisites for scheduling the second document, and transmitting, by the second proxy server, the second document for processing by another proxy server in response to determining that the validation status of the second proxy server is false; determining a validation status of the first document is executed in response to determining that a first attribute and a second attribute of the first document are not equal; determining a validation status of the first proxy server is executed in response to determining one of that the first proxy server is handling a scheduling request for the first time, or that the first proxy server has been modified since last handling a scheduling request; and scheduling the first document for publishing to one or more users includes retrieving data and any analytical objects that are to be applied to the first document to provide a populated document and transmitting the populated document to one or more users at a pre-determined time.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to a smart scheduling service for scheduling documents for publication to users. More particularly, implementations of the present disclosure provide a multi-stage scheduling service that operates on-demand, provides optimized schedule validation, and includes dynamic fail-over. Implementations can include actions of receiving, by an adaptive job server, a first document, determining, by the adaptive job server, a validation status of the first document based on one or more document-level pre-requisites associated with the first document, transmitting, by the adaptive job server, the first document to a first proxy server in response to determining that the validation status of the first document is true, determining, by the first proxy server, a validation status of the first proxy server based on one or more server-side pre-requisites for scheduling the first document, and scheduling, by the first proxy server, the first document for publishing to one or more users in response to determining that the validation status of the first proxy server is true.

To provide further context for implementations of the present disclosure, and as introduced above, enterprises implement software systems to conduct operations. Operations of an enterprise generate massive amounts of data including, for example, financial data, sales data, product data, manufacturing data, human resources data, and the like. In an effort to efficiently operate, enterprises seek to understand the data representing operations of the enterprise. To this end, software systems have been developed that process data to generate analytical data, which can include, without limitation, summaries, insights, and visualizations.

An example software system includes, without limitation, SAP Lumira provided by SAP SE of Walldorf, Germany. Although SAP Lumira is referenced herein, implementations of the present disclosure can be realized with any appropriate software system.

In some instances, analytical data is periodically published to users within the enterprise in electronic documents. In some examples, an electronic document (also referred to as a document herein) is a computer-generated document that is stored in a computer-readable file. Example documents can include, without limitation, portable document format (PDF) documents, extensible markup language (XML) documents, hypertext markup language (HTML) documents, email documents (e.g., .msg) and word processor documents (e.g., .doc, .txt). Such documents can include analytical data that periodically changes. For example, analytical data for a first time period (e.g., day, week, month, year) can be different than analytical data for a second time period (e.g., day, week, month, year). Consequently, a document can be periodically published based on a schedule and, with each publication, analytical data in the document can be updated.

Scheduling of documents, however, has certain requirements for problem-free publication. In some examples, a document format can implicate server-side requirements for a server that generates the document. For example, PDF documents can require a Chromium plugin and/or Java scheduling service on servers. In some examples, document-level pre-requisites are also enforced for scheduling. For example, document-level requirements can include a particular component and/or script being installed. Failure in execution of schedules for publishing documents is highly problematic. For example, because of the multiple server-side and/or document-level requirements for different document formats, it can be extremely difficult to determine a correct the cause of the failure.

In a non-limiting example, a single-node server landscape can be considered, in which 50 documents can be schedule for publication to 50 users. All of the schedule requests are handled by a single-node server and, in this example, the schedule starts failing (e.g., server-side and/or document-level pre-requisites are not met). A user tasked with rectifying the failure (e.g., an administrator) must wait until the entire scheduling job (which is serving a schedule of 50 documents) is performed to examine whether the failure occurred due to server-side issues or if there is any document-specific issue resulting to the failure. This can result in documents not be published at their scheduled time, because, for example, the user must wait for entire schedule to complete before being able to look into the failure. Further, investigating the failure is time- and resource-inefficient, because the user needs to examine all documents and the server to identify the root cause. This can include, for example, detailed review of numerous log files and alignment with product documents. In some instances, an external consultant might need to participate for resolution.

In another non-limiting example, a multi-node server cluster landscape (e.g., four servers) can be considered, in which hundreds of documents can be scheduled for publication to hundreds of users in a clustered environment. If one of the servers is faulty (e.g., missing pre-requisites), there is a likelihood that a larger number of documents will fail (e.g., 25% of documents fail). Though the faulty server may handle other workflows seamlessly, schedule requests fail due to the issue (e.g., missing pre-requisites). Like the non-limiting example above, the user needs to wait for scheduling to finish for all of the hundreds of documents, then investigate all documents and all log files for each server.

In view of the above context, implementations of the present disclosure provide a smart scheduling service for scheduling documents for publication to users. More particularly, implementations of the present disclosure provide a multi-stage scheduling service that operates on-demand, provides optimized schedule validation, and includes dynamic fail-over.

Figure 1:
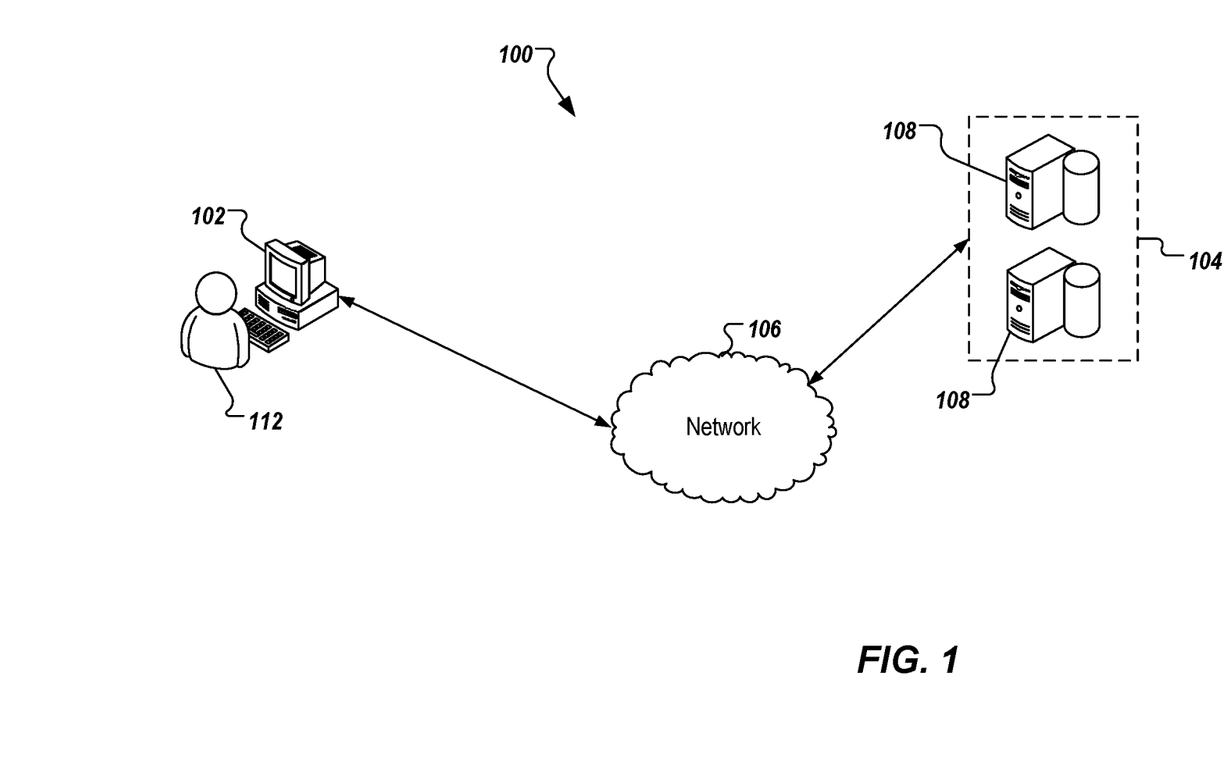
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

Figure 2:
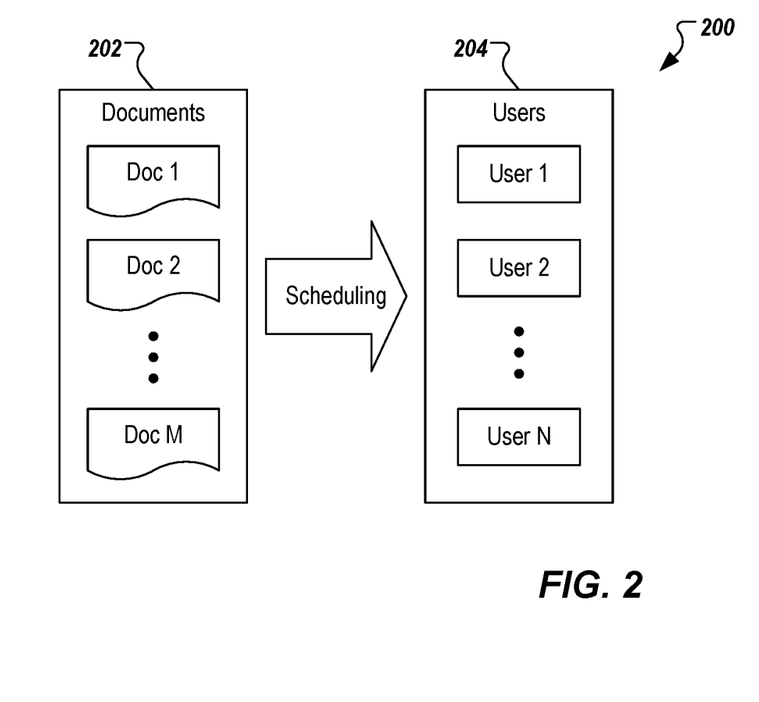
FIG. 2 depicts an example conceptual diagram representing document scheduling.

In accordance with implementations of the present disclosure, the server system 104 can host a smart scheduling service. For example, and as described in further detail herein, the server system 104 can include an adaptive job server (AJS) that receives each document in a set of documents that are to be scheduled for delivery to a set of users. FIG. 2 depicts an example set of documents 202 (e.g., documents 1, . . . , M) that are to be scheduled for publication to an example set of users 204 (e.g., users 1, . . . , N). Each document is associated with a set of attributes. Example attributes include, without limitation, a document modified date ($D_{mod}$), a document last modified date ($D_{lmod}$), and a validation status.

In some examples, when a document is newly created the document modified date and the document last modified date are the same (e.g., both are set to the timestamp at the time of saving the document to memory). For example, a document can be created and stored to memory on Jan. 1, 2020 at 12:30 PM. Consequently, the document modified date and the document last modified date can be both set equal to Jan. 1, 2020 at 12:30 PM (e.g., a UNIX timestamp of 1577903400). In some examples, when a document is modified, the document modified date is set equal to the document last modified date and the document last modified date is updated (e.g., set to the timestamp at the time of saving the (modified) document to memory). For example, a document can have a document modified date of Jan. 1, 2020 at 12:30 AM and a document last modified date of Jan. 15, 2020 at 6:00 AM (e.g., the document was created and saved on Jan. 1, 2020 at 12:30 AM and was modified on Jan. 15, 2020 at 6:00 AM). If, in this example, the document is modified on Jan. 20, 2020 at 10:00 AM, the document modified date is set equal to Jan. 15, 2020 at 6:00 AM and the document last modified date is set equal to Jan. 20, 2020 at 10:00 AM).

Further, each document should include one or more scripts and/or one or more components that are required for scheduling (i.e., document-level pre-requisites). An example script includes exportReport( ) which fetches a UI element chosen for export and later uses chromium/chrome libraries to render a PDF document for scheduling. An example component includes EXPORT_PDF, which is a code/library component that enables a document to export as a PDF document for scheduling. Other example technical components include, without limitation, EXPORT EXCEL and EXPORT CSV, for which an export( ) script fetches the cells and construct CSV or Excel format for schedule for a particular chart or crosstab.

In some implementations, the AJS selectively processes each document through a first-stage schedule validation service (SVS-1) to determine whether each document meets respective document-level pre-requisites. If a document meets its respective document-level pre-requisites (e.g., is determined to be validated through SVS-1), the document is provided to a proxy server. An example proxy server includes a proxy Java server (PJS). While implementations of the present disclosure are described with reference to a PJS, implementation of the present disclosure are not limited to a PJS. In some implementations, the PJS selectively processes the document through a second-stage schedule validation service (SVS-2) to determine whether the PJS meets respective server-side pre-requisites for scheduling of the document. If the PJS meets its respective server-side requirements (e.g., is determined to be validated through SVS-2), the document is scheduled for processing and publication to one or more users. Example server-side pre-requisites can include, without limitation, the presence of a "LumsRefresh Java Scheduling Service" (e.g., a service specific to SAP Lumira), presence of a Google chrome plug-in, whether Bash profile or command line parameters are incorrect or missing, and whether schedulepolling.time is missing.

Figure 3:
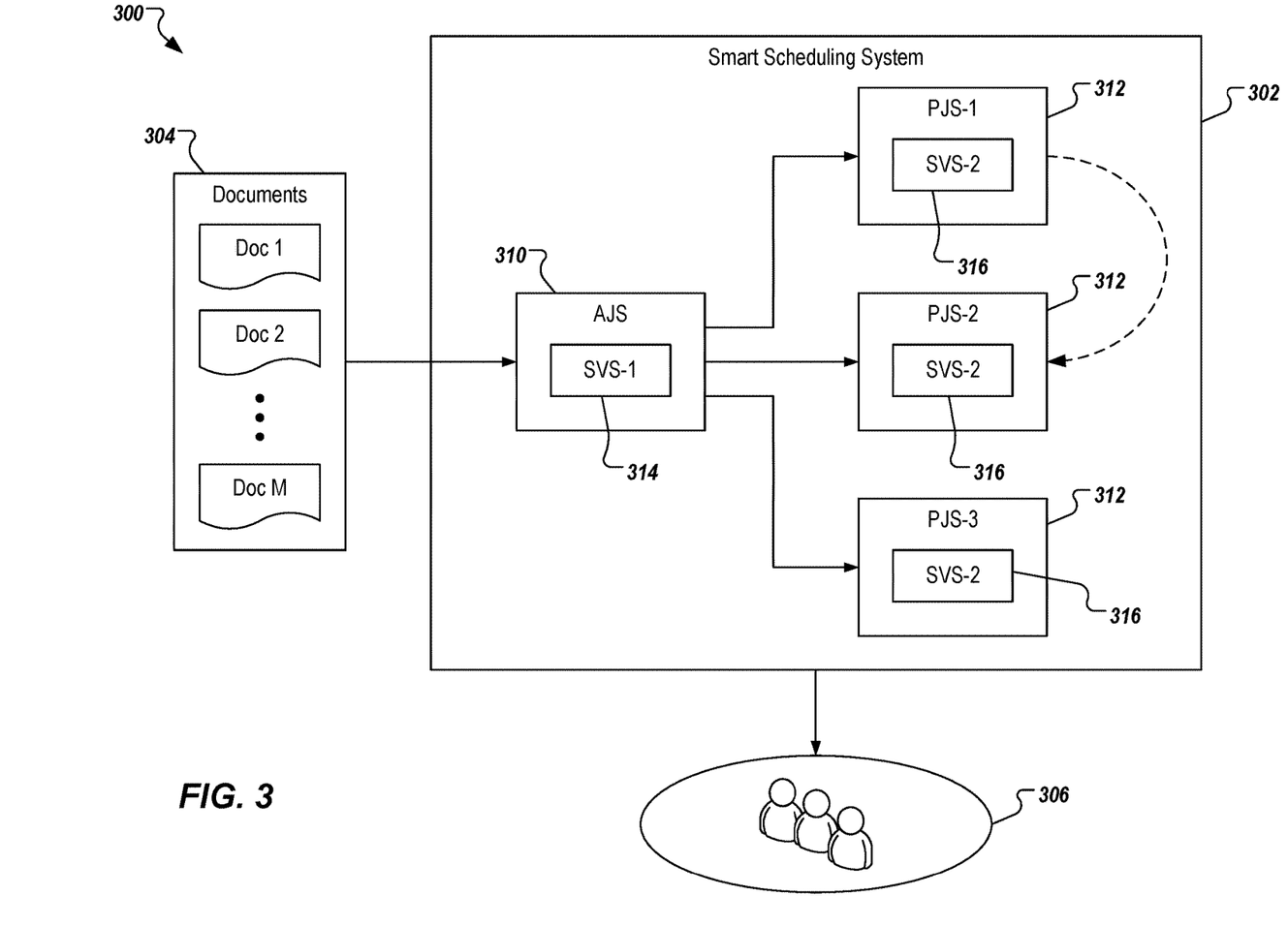
FIG. 3 depicts an example conceptual architecture in accordance with implementations of the present disclosure.

FIG. 3 depicts an example conceptual architecture 300 in accordance with implementations of the present disclosure. In the depicted example, the example conceptual architecture 300 includes a smart scheduling system 302 that processes documents 304 for publication to users 306. The smart scheduling system 302 includes an AJS 310 and multiple PJSs 312. The AJS 310 includes a SVS-1 module 314 and each PJS 312 includes a SVS-2 module 316.

As described in further detail herein, the SVS-1 module 314 of the AJS 310 selectively processes each document in the set of documents 304 through the SVS-1 module 314 to determine whether the document is validated. In some examples, a document is determined to be validated, if it meets all applicable document-level pre-requisites. If the document does not meet all of the applicable document-level pre-requisites, the document is blocked from scheduling, a notification (also referred to herein as an alert) is issued, and the SVS-1 module 314 selectively processes another document in the set of documents 304.

If the document is validated through the SVS-1 module 314, the document is provided to a PJS 312. In some examples, which PJS 312 receives the document can be determined based on a load-balancing process. In some implementations, each PJS 312 includes a respective property indicating a validation status of the respective PJS 312 (e.g., true, false). As described in further detail herein, the SVS-2 module 316 of the PJS 312 selectively processes attributes of the PJS 312 in view of the particular document through the SVS-2 module 316 to determine whether the PJS 312 is validated. In some examples, the PJS 312 is determined to be validated for the particular document, if it meets all applicable server-side pre-requisites for that document. If the PJS 312 does not meet all of the applicable server-side pre-requisites, the document is rerouted to another PJS 312 for processing and a notification (also referred to herein as an alert) is issued. If the PJS 312 is validated through the SVS-2 module 316, the document is scheduled for processing and publication to one or more users.

In further detail, the smart scheduling service is performed on-demand. For example, the SVS-1 automatically executes for each new document or modified document, and the SVS-2 automatically executes for each new server or modified server. In some examples, a new server includes a PJS that has been added for scheduling of documents. In some examples, a modified server includes a PJS that has been repaired (e.g., a patch has been deployed to the server) or upgraded (e.g., software executing on the server has been upgraded to a newer version). Accordingly, if a document is not new and not modified since last scheduling, the SVS-1 is not performed. Similarly, if the server is not new and not modified since last scheduling of a particular document type, the SVS-2 is not performed.

Further, the smart scheduling service of the present disclosure is optimized. For example, the SVS-1 and/or the SVS-2 are only executed for schedule jobs. The smart scheduling service is not performed for other workflows (e.g., open/delete/edit/refresh of a document; server stop/start/restart). Further, the smart scheduling service runs only once for each document. Once a document is validated, the document is skipped from validation through SVS-1 in all future schedule workflows unless the document is modified. Similarly, the smart scheduling service runs only once for each server. Once a server is validated for a particular document, the server is skipped from validation through SVS-2 in all future schedule workflows unless the server is modified.

In some implementations, and as described in further detail herein, if a document is processed and it is determined that one or more document-level pre-requisites are missing by the SVS-1, scheduling of the document is stopped. A notification is issued (e.g., an email is sent to an administrator) to indicate the document that has been stopped from scheduling and the reason why (e.g., the pre-requisite(s) missing for the document). In some implementations, and as also described in further detail herein, if a server is processed and it is determined that one or more server-side pre-requisites are missing by the SVS-2, the scheduling job is stopped and the server will not be considered for any future scheduling jobs until it is repaired or modified (e.g., a missing pre-requisite is installed on the server). A notification is issued (e.g., an email is sent to an administrator) to indicate the server that has been stopped from scheduling and the reason why (e.g., the pre-requisite(s) missing from the server).

In some implementations, the smart scheduling service of the present disclosure provides for fail-over. For example, in a cluster node server, if a server is blocked from scheduling (e.g., the SVS-2 finds the server as missing one or more server-side pre-requisites), any scheduling request for the server are re-distributed to other servers. In some examples, the (faulty) server is registered as non-compliant. In future scheduling jobs, the (faulty) server is ignored for scheduling until the missing pre-requisite(s) is/are corrected). However, in some examples, the server is still used for one or more other (non-scheduling) jobs.

In accordance with implementations of the present disclosure, and referring again to FIG. 3, a scheduling job is initiated to schedule the set of documents 304 for publication to the users 306. The AJS 310 receives a document (e.g., Doc 1) and processes the document through the SVS-1 module 314. In some implementations, the SVS-1 module 314 determines whether the document modified date is older than the document last modified date. If the document modified date is equal to the document last modified date, the SVS-1 module 314 does not validate the document-level pre-requisites of the document and, instead, reads the validation status of the document. If the validation status is empty (e.g., the document is a new document that has not yet been validated), the SVS-1 module 314 validates the document-level pre-requisites of the document. If the validation status is true, the document will be routed to a PJS 312 for scheduling, and if validation status is false, the document will be blocked for scheduling.

If the document modified date is older than the document last modified date, the SVS-1 module 314 sets a validation status of the document based on whether the document has one or more pre-requisites that are required for scheduling of the document. For example, for each document type, a set of document-level pre-requisites is provided. The SVS-1 module 314, determines the set of document-level pre-requisites based on the document type, then checks the document against the set of document-level pre-requisites. If the document is missing any document-level pre-requisite, the document is determined to be invalid and the validation status is set to false. The document is blocked from scheduling and a notification is issued. The AJS 310 receives another document (e.g., Doc 2) and processes the document through the SVS-1 module 314, as described herein. If the document includes each of the document-level pre-requisites in the set of document-level pre-requisites, the document is determined to be valid and the validation status is set to true. The document is transmitted to a PJS 312 for scheduling, and the AJS 310 receives another document (e.g., Doc 2) and processes the document through the SVS-1 module 314, as described herein.

In some implementations, a PJS 312 receives the document (which was determined to be valid through the SVS-1 in terms of document-level pre-requisites) and the SVS-2 module 316 determines whether the PJS 312 includes all of the server-side pre-requisites for scheduling the document. In some examples, the SVS-2 module 316 determines whether the document is to be processed for a scheduling job as opposed to another type of job (e.g., open, refresh or view workflows). If the document is to be processed for another type of job, the PJS 312 proceeds to process the document. If the document is to be processed for scheduling, the SVS-2 module 316 determines whether the PJS 312 is handling a scheduling request for the first time, or whether a server status indicates that the PJS 312 is modified (e.g., repaired, upgraded since last executing a scheduling job).

If it is the first time the PJS 312 is handling a scheduling request, or the server status indicates that the PJS 312 is modified, the SVS-2 module 316 performs the SVS-2 to validate the PJS 312. More particularly, the SVS-2 module 316 sets a validation status of the PJS 312 based on whether the PJS 312 has one or more pre-requisites that are required for scheduling of the document. In some examples, the PJS 312 includes a rule engine that provides the server-side pre-requisites. The SVS-2 module 316 accesses the rule engine loaded on the PJS 312 to validate the server-side pre-requisites. For example, for each document type, a set of server-side pre-requisites is provided. The SVS-2 module 316, determines the set of server-side pre-requisites based on the document type, then checks the features of the PJS 312 against the set of server-side pre-requisites. If the PJS 312 is not missing any server-side pre-requisite, the PJS 312 is determined to be valid, the validation status is set to true, and the PJS 312 proceeds to schedule the document (e.g., the document is processed to retrieve data, any analytical objects are applied to the document with the latest data, and the document is published to one or more users scheduled to receive the document). If the PJS 312 is missing any server-side pre-requisite, the PJS 312 is determined to be invalid and the validation status is set to false. The PJS 312 is blocked from scheduling any additional documents, a notification is issued, and the PJS 312 transmits the document to another PJS 312 for scheduling. In some examples, the PJS 312 queries a list of available PJSs having validation status of TRUE and routes (e.g., through a load balancer) the scheduling request to one of the available PJSs. If all PJSs have a validation status of FALSE, the process ends without scheduling of the document.

In some implementations, if it is not the first time the PJS 312 is handling a scheduling request, and the server status does not indicate that the PJS 312 is modified, the SVS-2 module 316 checks the validation status of the PJS 312. If the validation status is true, the PJS 312 proceeds to schedule the document. If the validation status is false, the PJS 312 transmits the document to another PJS 312 for scheduling.

Figure 4:
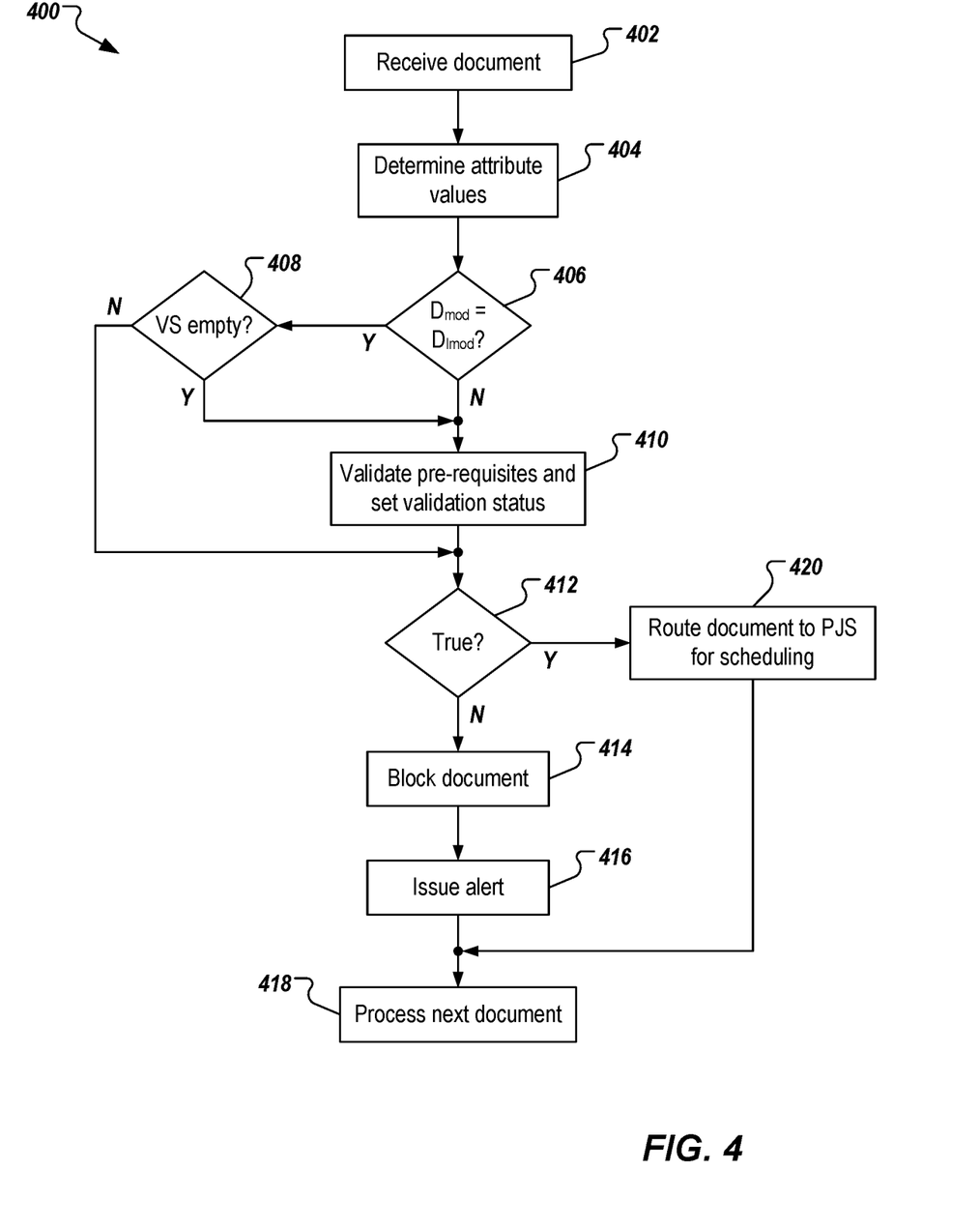
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices. In some examples, at least a portion of the example process 400 of FIG. 4 is only executed for processing of a scheduling workflow (scheduling job).

A document is received (402). For example, the AJS 310 of FIG. 3 receives a document (e.g., Doc 1) of the documents 304. One or more attribute values of the document are determined (404). For example, the AJS 310 (e.g., executing the SVS module 314) determines $D_{mod}$ and $D_{lmod}$ of the document. It is determined whether $D_{mod}$ is equal to $D_{lmod}$ (406). If $D_{mod}$ is equal to $D_{lmod}$, it is determined with a validation status (VS) of the document is empty (408). For example, the AJS 310 (e.g., executing the SVS module 314) determines the validation status of the document. If the validation status is empty (e.g., the document is a new document that has not been validated), or if $D_{mod}$ is not equal to Dolma, document-level pre-requisites of the document are validated and a validation status of the document is set (410). For example, and as described herein, For example, the AJS 310 (e.g., executing the SVS module 314) reviews document-level pre-requisites of the document in view of a set of document-level pre-requisites and sets the validation status to true, if the document includes all document-level pre-requisites, or sets the validation status to false if the document is absent any document-level pre-requisite.

It is determined whether the validation status of the document is true (412). If the validation status of the document is not true, the document is blocked from scheduling (414), an alert is issued (416), and a next document is processed (418). If the validation status is true, the document is routed to a PJS for scheduling (420) and a next document is processed (418).

Figure 5:
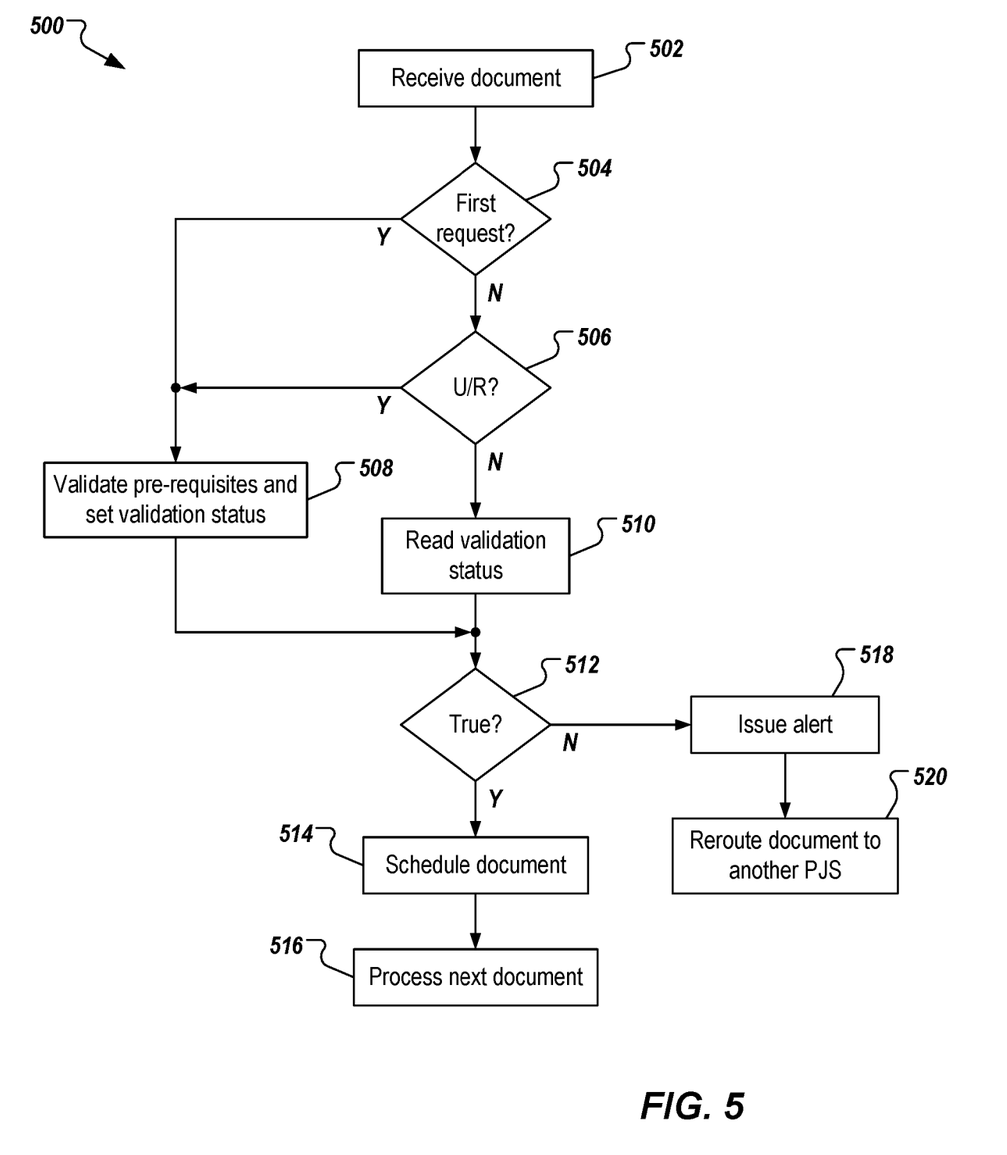
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices. In some examples, at least a portion of the example process 500 of FIG. 5 is only executed for processing of a scheduling workflow (scheduling job).

A document is received (402). For example, a PJS 312 of FIG. 3 receives a document from the AJS 310. It is determined whether this is the first scheduling request (504). If it is the first scheduling request, server-side pre-requisites are validated to set a validation status (508). If it is not the first scheduling request, it is determined whether the server has been upgraded or repaired since the last scheduling request (506). If the server has been upgraded or repaired (modified) since the last scheduling request, server-side pre-requisites are validated to set a validation status (508). For example, if it is the first time the PJS 312 is handling a scheduling request, or the server status indicates that the PJS 312 is modified, the SVS-2 module 316 performs the SVS-2 to validate the PJS 312. More particularly, the SVS-2 module 316 sets a validation status of the PJS 312 based on whether the PJS 312 has one or more pre-requisites that are required for scheduling of the document, as described herein. If the server has not been upgraded or repaired since the last scheduling request, a validation status of the server is read (510). It is determined whether the validation status of the server is true (512). If the validation status of the server is true, the document is scheduled (514), and a next-received document is processed (516). If the validation status of the server is not true, an alert is issued and the document is rerouted to another server (520).

Figure 6:
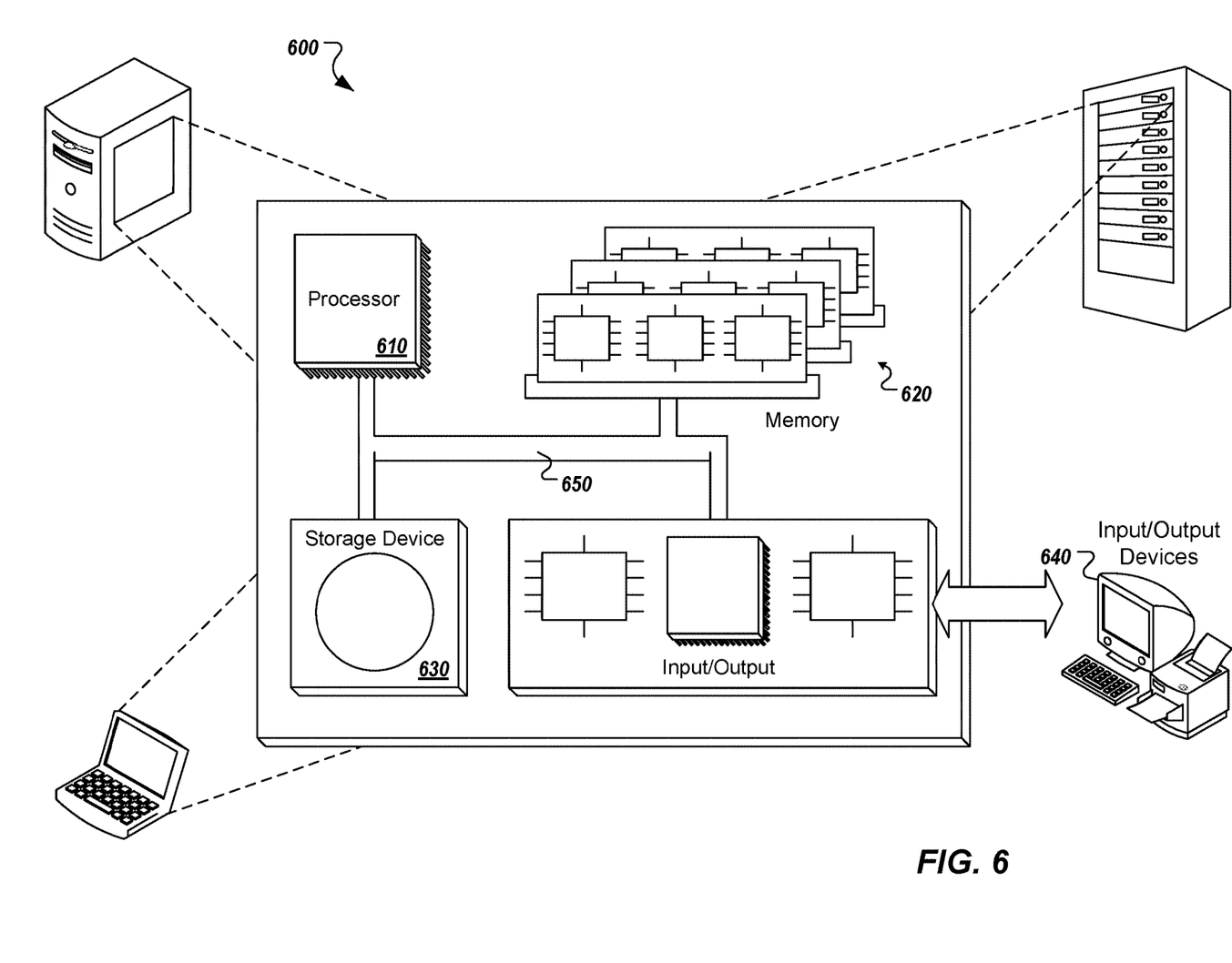
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for smart scheduling of documents for publishing to one or more users, the method being executed by one or more processors and comprising:

receiving, by an adaptive job server, a first document;

determining, by the adaptive job server, whether the first document is one of new and modified or the first document is not one of new and modified based on a modification date and a last modification date of the first document;

in response to determining that the first document is one of new and modified, determining, by the adaptive job server, a validation status of the first document based on one or more document-level pre-requisites associated with the first document, the document-level pre-requisites comprising one or more scripts or one and more components required for scheduling;

in response to determining that the first document is not one of new and modified, determining whether the validation status of the first document is empty;

in response to determining that the validation status of the first document is empty, determining whether the validation status of the first document is true or false based on the document-level pre-requisites, where:

in response to determining that the validation status of the first document is true:

transmitting, by the adaptive job server, the first document to a first proxy server of a plurality of proxy servers, and scheduling, by the first proxy server, the first document for publishing to one or more users; and in response to determining that the validation status of the first document is false:

blocking the first document from being scheduled for publishing.

2. The method of claim 1, further comprising:

receiving, by the adaptive job server, a second document; and determining, by the adaptive job server, a validation status of the second document based on one or more document-level pre-requisites associated with the second document.

3. The method of claim 2, further comprising, in response to determining that the validation status of the second document is false: blocking the second document from scheduling and performing one or more of issuing a notification and receiving a third document.

4. The method of claim 2, further comprising:

transmitting, by the adaptive job server, the second document to a second proxy server of the proxy servers in response to determining that the validation status of the second document is true;

determining, by the second proxy server, a validation status of the second proxy server based on one or more server-side pre-requisites for scheduling the second document; and transmitting, by the second proxy server, the second document for processing by another proxy server in response to determining that the validation status of the second proxy server is false.

5. The method of claim 1, wherein determining a validation status of the first document is executed in response to determining that a first attribute and a second attribute of the first document are not equal.

6. The method of claim 1, wherein determining a validation status of the first proxy server is executed in response to determining one of:
- that the first proxy server is handling a scheduling request for the first time, or
- that the first proxy server has been modified since last handling a scheduling request.

7. The method of claim 1, wherein scheduling the first document for publishing to one or more users comprises retrieving data and any analytical objects that are to be applied to the first document to provide a populated document and transmitting the populated document to one or more users at a pre-determined time.

8. A system, comprising:
- a computing device; and
- a computer-readable storage device coupled to the computing device and having instructions stored thereon which, when executed by the computing device, cause the computing device to perform operations for smart scheduling of documents for publishing to one or more users, the operations comprising:
  - receiving, by an adaptive job server, a first document;
  - determining, by the adaptive job server, whether the first document is one of new and modified or the first document is not one of new and modified based on a modification date and a last modification date of the first document;
  - in response to determining that the first document is one of new and modified, determining, by the adaptive job server, a validation status of the first document based on one or more document-level pre-requisites associated with the first document, the document-level pre-requisites comprising one or more scripts or one and more components required for scheduling;
  - in response to determining that the first document is not one of new and modified, determining whether the validation status of the first document is empty;
  - in response to determining that the validation status of the first document is empty, determining whether the validation status of the first document is true or false based on the document-level pre-requisites, where:
    - in response to determining that the validation status of the first document is true:
      - transmitting, by the adaptive job server, the first document to a first proxy server of a plurality of proxy servers, and
      - scheduling, by the first proxy server, the first document for publishing to one or more users; and
    - in response to determining that the validation status of the first document is false:
      - blocking the first document from being scheduled for publishing.

9. The system of claim 8, wherein operations further comprise:
- receiving, by the adaptive job server, a second document; and
- determining, by the adaptive job server, a validation status of the second document based on one or more document-level pre-requisites associated with the second document.

10. The system of claim 9, wherein operations further comprise, in response to determining that the validation status of the second document is false: blocking the second document from scheduling and performing one or more of issuing a notification and receiving a third document.

11. The system of claim 9, wherein operations further comprise:
- transmitting, by the adaptive job server, the second document to a second proxy server of the proxy servers in response to determining that the validation status of the second document is true;
- determining, by the second proxy server, a validation status of the second proxy server based on one or more server-side pre-requisites for scheduling the second document; and
- transmitting, by the second proxy server, the second document for processing by another proxy server in response to determining that the validation status of the second proxy server is false.

12. The system of claim 8, wherein determining a validation status of the first document is executed in response to determining that a first attribute and a second attribute of the first document are not equal.

13. The system of claim 8, wherein determining a validation status of the first proxy server is executed in response to determining one of:
- that the first proxy server is handling a scheduling request for the first time, or
- that the first proxy server has been modified since last handling a scheduling request.

14. A non-transitory computer-readable storage medium coupled to one or more processors and having instructions stored thereon which, when executed by the one or more processors, cause the one or more processors to perform operations for smart scheduling of documents for publishing to one or more users, the operations comprising:
- receiving, by an adaptive job server, a first document;
- determining, by the adaptive job server, whether the first document is one of new and modified or the first document is not one of new and modified based on a modification date and a last modification date of the first document;
- in response to determining that the first document is one of new and modified, determining, by the adaptive job server, a validation status of the first document based on one or more document-level pre-requisites associated with the first document, the document-level pre-requisites comprising one or more scripts or one and more components required for scheduling;
- in response to determining that the first document is not one of new and modified, determining whether the validation status of the first document is empty;
- in response to determining that the validation status of the first document is empty, determining whether the validation status of the first document is true or false based on the document-level pre-requisites, where:
  - in response to determining that the validation status of the first document is true:
    - transmitting, by the adaptive job server, the first document to a first proxy server of a plurality of proxy servers, and
    - scheduling, by the first proxy server, the first document for publishing to one or more users; and
  - in response to determining that the validation status of the first document is false:

blocking the first document from being scheduled for publishing.

15. The computer-readable storage medium of claim 14, wherein operations further comprise:
   receiving, by the adaptive job server, a second document; and
   determining, by the adaptive job server, a validation status of the second document based on one or more document-level pre-requisites associated with the second document.

16. The computer-readable storage medium of claim 15, wherein operations further comprise, in response to determining that the validation status of the second document is false: blocking the second document from scheduling and performing one or more of issuing a notification and receiving a third document.

17. The computer-readable storage medium of claim 15, wherein operations further comprise:
   transmitting, by the adaptive job server, the second document to a second proxy server of the proxy servers in response to determining that the validation status of the second document is true;
   determining, by the second proxy server, a validation status of the second proxy server based on one or more server-side pre-requisites for scheduling the second document; and
   transmitting, by the second proxy server, the second document for processing by another proxy server in response to determining that the validation status of the second proxy server is false.

18. The computer-readable storage medium of claim 14, wherein determining a validation status of the first document is executed in response to determining that a first attribute and a second attribute of the first document are not equal.

19. The computer-readable storage medium of claim 14, wherein determining a validation status of the first proxy server is executed in response to determining one of:
   that the first proxy server is handling a scheduling request for the first time, or
   that the first proxy server has been modified since last handling a scheduling request.

20. The computer-readable storage medium of claim 14, wherein scheduling the first document for publishing to one or more users comprises retrieving data and any analytical objects that are to be applied to the first document to provide a populated document and transmitting the populated document to one or more users at a pre-determined time.

\* \* \* \* \*